United States Patent
Pearson et al.

(10) Patent No.: US 12,072,790 B1
(45) Date of Patent: Aug. 27, 2024

(54) MUTATION TESTING WITHIN CONTINUOUS INTEGRATION SYSTEMS

(71) Applicant: State Farm Mutual Automobile Insurance Company, Bloomington, IL (US)

(72) Inventors: Andrew L Pearson, Normal, IL (US); Nate Shepherd, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 122 days.

(21) Appl. No.: 17/224,904

(22) Filed: Apr. 7, 2021

(51) Int. Cl.
  *G06F 9/44* (2018.01)
  *G06F 11/36* (2006.01)

(52) U.S. Cl.
  CPC ...... *G06F 11/3688* (2013.01); *G06F 11/3676* (2013.01); *G06F 11/3684* (2013.01); *G06F 11/3692* (2013.01)

(58) Field of Classification Search
  CPC .............. G06F 11/3692; G06F 11/3684; G06F 11/3676; G06F 11/3688
  See application file for complete search history.

(56) References Cited

U.S. PATENT DOCUMENTS

| | | | |
|---|---|---|---|
| 6,101,580 A | 8/2000 | Agesen | |
| 6,298,317 B1 * | 10/2001 | Wiemann | G06F 11/3688 703/22 |
| 7,089,272 B1 | 8/2006 | Garthwaite et al. | |
| 9,430,194 B1 | 8/2016 | Childs et al. | |
| 10,007,515 B2 | 6/2018 | Subramanian et al. | |
| 10,387,295 B1 | 8/2019 | Kesarwani | |
| 10,949,172 B1 * | 3/2021 | Jain | G06F 11/3676 |
| 2003/0025722 A1 | 2/2003 | Cliff et al. | |
| 2005/0188364 A1 | 8/2005 | Cockx et al. | |

(Continued)

OTHER PUBLICATIONS

Elizono, et al., "Recent Patents of Computational Intelligence", Centre of Computational Intelligence, School of Computing, De Monfort University, 11 pgs.

(Continued)

*Primary Examiner* — Chat C Do
*Assistant Examiner* — Lenin Paulino
(74) *Attorney, Agent, or Firm* — Lee & Hayes, P.C.

(57) ABSTRACT

Techniques described herein relate to implementing mutation testing of software applications associated with continuous integration (CI) systems. A mutation test system may determine one or more portions of modified source code within an application codebase. Mutated applications may be generated based on the modified source code, and a mutation test system may determine subsets application test suites for execution based on the portions of the modified source code and/or other factors. In various examples, the mutation test system may use mappings between portions of source code and test subsets, and/or machine-learned models or heuristics-based techniques to determine subsets of test suites based on discreet source code modifications. Mutation testing can be performed by executing the determined test subsets on the mutated applications, and the results may be used by the CI system to control the integration of the code changes into the shared source code repository and/or automated testing of the application build.

20 Claims, 7 Drawing Sheets

(56) References Cited

U.S. PATENT DOCUMENTS

| | | | |
|---|---|---|---|
| 2005/0240737 | A1 | 10/2005 | Holt |
| 2008/0109641 | A1 | 5/2008 | Ball et al. |
| 2008/0307006 | A1 | 12/2008 | Lee et al. |
| 2009/0307500 | A1* | 12/2009 | Sato .................. G06F 21/14 713/190 |
| 2010/0146490 | A1 | 6/2010 | Grosse et al. |
| 2010/0241827 | A1* | 9/2010 | Yu ...................... G06F 8/314 712/30 |
| 2014/0157232 | A1 | 6/2014 | Li |
| 2015/0095894 | A1 | 4/2015 | Tripp |
| 2015/0100951 | A1 | 4/2015 | Raundahl Gregersen |
| 2015/0309914 | A1 | 10/2015 | Eddington et al. |
| 2015/0363175 | A1 | 12/2015 | Klausner |
| 2016/0048444 | A1* | 2/2016 | Crova .............. G06F 11/3676 717/124 |
| 2016/0216962 | A1 | 7/2016 | Wang et al. |
| 2017/0012819 | A1 | 1/2017 | Raheja et al. |
| 2017/0068612 | A1 | 3/2017 | Herzig et al. |
| 2018/0074936 | A1* | 3/2018 | Broadbent .......... G06F 11/3604 |
| 2018/0095869 | A1* | 4/2018 | Peer .................... G06F 11/3664 |
| 2018/0232300 | A1* | 8/2018 | Cmielowski ........ G06F 11/3688 |
| 2018/0321918 | A1* | 11/2018 | McClory ............. H04L 63/0281 |
| 2018/0365139 | A1 | 12/2018 | Rajpal |
| 2019/0227786 | A1 | 7/2019 | Price et al. |
| 2020/0042882 | A1 | 2/2020 | Liu et al. |
| 2020/0073790 | A1* | 3/2020 | Abhishek ............ G06F 11/3676 |
| 2021/0096831 | A1 | 4/2021 | Satyarth |
| 2021/0141714 | A1* | 5/2021 | Lees .................. G06F 11/3409 |
| 2022/0327043 | A1 | 10/2022 | Pearson |
| 2022/0327045 | A1 | 10/2022 | Pearson |
| 2023/0418733 | A1 | 12/2023 | Pearson |

OTHER PUBLICATIONS

Kim, et al., "Invasive Software Testing: Mutating Target Programs to Diversify Test Exploration for High Test Coverage", IEEE, 2018, pp. 239-249.

Gligoric, et al., "Selective Mutation Testing for Concurrent Code", ISSTA, Jul. 2013, pp. 224-234.

Irvine, et al., "Jumble Java Byte Code to Measure the Effectiveness of Test Units", Testing: Academic and Industrial Conference—Practice and Research Techniques, Mar. 2007, pp. 169-175.

Office Action for U.S. Appl. No. 17/224,873, mailed on Jun. 16, 2021, Pearson, "Mutation Testing in Parallel Threads", 23 Pages.

Auerbach et al., "Lime: a Java-Compatable and Synthesizable Language for Heterogeneous Architectures", IBM Research, 2010, pp. 89-108.

Park, et al., "Fuzzing JavaScript Engines with Aspect-preserving Mutation" 2020 IEEE Symposium on Security and Privacy, 2020, pp. 1628-1642.

Kim, "Class Mutation: Mutation Testing for Object-Oriented Programs", 2000, 15 pgs.

Lochab, "Analysis of Mutation Tools in Aspect Orieted Software Engineering", 2013, 10 pgs.

Office Action for U.S. Appl. No. 17/224,904, mailed on May 26, 2022, Pearson, "Mutation Testing Within Continuous Integration Systems ", 32 pages.

Office Action for U.S. Appl. No. 17/486,682, mailed on Feb. 17, 2023, Pearson, "Mutation Testing in Parallel Threads", 31 Pages.

Office Action for U.S. Appl. No. 17/486,682, mailed on Oct. 21, 2022Pearson, "Mutation Testing in Parallel Threads", 27 Pages.

Office Action for U.S. Appl. No. 17/558,279, mailed on Oct. 25, 2022, Pearson, "Runtime Class Recompilation During Mutation Testing", 18 Pages.

\* cited by examiner

200

```
23      if (selection_num >= variable)
24              process_selection (user_id, selection_num, 7)
25      else
26              variable++
27              request_update (user_id, variable)
28      end
```

```
23      if (selection_num < variable)
24              process_selection (user_id, selection_num, 7)
25      else
26              variable++
27              request_update (user_id, variable)
28      end
```

```
23      if (selection_num >= variable)
24              process_selection (user_id, selection_num, 7)
25      else
26              variable--                               208
27              request_update (user_id, variable)
28      end
```

```
23      if (selection_num >= variable)
24              process_selection (user_id, selection_num, 7)
25      // else                          212
26              variable++
27              request_update (user_id, variable)
28      end
```

FIG. 2D

SOURCE CODE - TEST CASE MAPPINGS

| CLASS | FUNCTION | LINE | ASSOCIATED TEST CASES |
|---|---|---|---|
| [class name 1] | [function A] | [line #] | [test listing(s) 1] |
| [class name 1] | [function B] | [line #] | [test listing(s) 2] |
| [class name 2] | [function C] | [line #] | [test listing(s) 3] |
| ... | ... | ... | ... |

FIG. 3

MUTATION TESTING WITHIN CONTINUOUS INTEGRATION SYSTEMS

TECHNICAL FIELD

The present disclosure relates to software development and deployment. In particular, present disclosure describes techniques for performing mutation testing on software code within continuous integration and/or continuous deployment systems.

BACKGROUND

Continuous integration (CI) systems refer to software development workflows in which multiple developers working independently on an application may integrate their code into a shared source code repository. For instance, developers may implement new features or make changes to the codebase of the application, and then submit the code changes to the CI system to be integrated (or merged) within the shared source code repository. To make a change to the existing application codebase, a developer may check-out a portion of the code from the shared repository into a local development environment, where the developer can alter and test their code without affecting other developers. After the updated code builds and executes satisfactorily in the local environment, the developer may check the code back into shared repository. Developers may sync their local environments with the shared repository on a regular basis, so that changes submitted made by other developers are incorporated into their local environment.

To assure the continued operation and functionality of the application during development, the CI system may perform regular builds and functional testing on the shared source code repository. In some cases, CI systems are configured to automatically compile and build the application, and/or execute software test suites on the updated application based on a regular schedule (e.g., hourly, daily, weekly, etc.), or each time code changes from local environments are integrated into the overall codebase of the application. In some cases, CI systems may be associated with continuous deployment (CD) systems, in which the code changes integrated into the shared repository of the CI system and automatically tested and released into a production environment. When the CI system (or CI/CD system) detects a build failure or software functionality error caused by the integration of new code, the shared repository may be rolled back to the most recent version of the codebase that was successfully built and tested, and developers may work to analyze the failure by focusing on the code that was added or modified after previous successful build. Rolling back code changes from the shared repository, as well as analyzing build and test failures, are technical and resource-intensive tasks that take time and have the potential to delay the product development cycle for the application. Accordingly, it is important for developers to thoroughly test any code changes within their local development environments, before those changes are checked into the shared repository of the CI system. It is also important for the CI system to perform frequent rebuilds and comprehensive functional test runs when the shared codebase of the application changes, so that any build breaks or software bugs can be quickly identified and resolved.

During development of software applications, developers also prepare test cases to verify that the application operates as expected. Such test cases may include unit tests designed to test the functionality of relatively small pieces of code, and/or integration tests that test how multiple pieces of code interact. Because individual test cases may be designed to test one or more relatively small aspects of the overall software application, software developers often create large numbers of tests for the application, which can be grouped and executed as one or more test suites. Within a large-scale and robust application, a software development and test team may maintain thousands or even millions of unit tests and/or integration tests that can be automated and run against an application build.

Software development tests may also perform mutation testing to verify that a suite of test cases adequately tests the application. Mutation testing is a form of white box testing that involves making a small change to the source code to create an application mutant that includes an intentional error or fault. For example, an application mutant can be created in part by changing a logical "and" operator in a line of code to a logical "or" operator, changing a ">" operator to "<" operator, changing a variable or constant value, etc. A suite of test cases can then be executed against the application mutant. If test cases fail due to the code change, the application mutant is considered to be "killed." This may indicate that the suite of test cases has been properly designed to detect errors in the software application. However, if all of the test cases pass despite the code changes that introduced faults into the application mutant, then the application mutant is considered not to be killed, and the success of the passing test cases against the application mutant may indicate that the current test suite is not designed to test and detect all possible errors in the application. In some examples, a quality level of a suite of test cases can be determined based on a percentage of application mutants that the suite of test cases kill.

While mutation testing of software applications is valuable, it can be inefficient and/or impractical for some applications and in some development environments. For various programming languages, mutation testing may require recompiling and rebuilding of some or all of the application classes to generate the mutated application. Certain tools used for automatic mutation testing may rely on compiling source code for the software application into bytecode that can be executed by a virtual machine, and then editing lines of the compiled bytecode to create the application mutants. However, for other programming languages, it may be difficult or impossible to reconstruct the original source code class files from a corresponding set of multiple compiled bytecode class files. It may also be difficult or impossible to determine, after compilation, how a change to the source code class file affected code in multiple compiled bytecode class files.

Additionally, the time and computing resources required to execute an entire test suite of unit tests and/or integration tests on the mutated executable application may cause mutation testing to be inefficient and impractical for use within CI system code integration processes. For instance, local development environments used by developers may lack sufficient computing resources to execute entire test suites on one or more mutated applications within a practical timeframe for pre-integration (or pre-merge) testing. Further, the large number of test cases required to test robust and complex applications may preclude mutation testing of the entire test suite as a requirement for performing a code check-in into the shared repository of the CI system. In such cases, the execution of the full test suite during mutation testing may cause unacceptable delays in the application development process.

SUMMARY

To address these and other problems and inefficiencies, this disclosure describes systems and techniques for implementing and executing mutation testing of software applications associated with continuous integration (CI) systems and/or continuous deployment (CI/CD) systems. Mutation testing can include altering the source code of a software application to create mutated applications, and executing unit tests and/or integration tests on the mutated applications. In various examples described herein, a mutation test system may determine one or more portions of modified source code within an application codebase. Before and/or after the integration of the altered code into the application codebase, the mutation test system may generate mutated applications based on the modified source code. The mutation test system also may determine subsets of one or more application test suites to be executed based on the portions of the modified source code and/or other factors. In various examples, the mutation test system may use mappings between portions of source code and test subsets, and/or machine-learned models or heuristics-based techniques to determine subsets of test suites based on the discreet source code modifications. Mutation testing can be performed by executing the determined test subsets on the mutated applications, and the results may be used by the CI system to control the integration of the code changes into the shared source code repository and/or automated testing of the application build.

In an example of the present disclosure, a computer-implemented method includes receiving, by a computer system, a request to integrate a source code change into a codebase associated with an application, and determining, by the computer system, that the source code change modifies a first line of source code within the codebase. The method in this example also includes determining, by a computer system, a first set of tests associated with the first line of source code, wherein the first set of tests is a first subset of a test suite associated with the application, and mutating, by the computer system, the source code change into a mutated source code change. Additionally, the method includes building, by the computer system, a mutated application by compiling one or more software classes including the mutated source code change, and executing, by the computer system, the first set of tests on the mutated application.

In another example of the present disclosure, a computer system comprises one or more processors, and one or more non-transitory computer-readable media storing computer-executable instructions that, when executed by the one or more processors, cause the one or more processors to perform various operations. The operations in this example include mutating a first line of source code in a codebase associated with an application, into a mutated first line of source code, building a mutated application by compiling one or more software classes including the mutated first line of source code, and executing a test suite associated with the application, on the mutated application. The operations in this example further include determining a first subset of the test suite associated with the first line of source code, based at least in part on test results associated with executing the test suite, and storing an association in a mapping data store, between the first subset of the test suite and the first line of source code.

Yet another example of the present disclosure includes one or more non-transitory computer-readable media storing instructions executable by a processor, wherein the instructions, when executed, cause the processor to perform various operations. The operations in this example include receiving a request to integrate a source code change into a codebase associated with an application, and determining that the source code change affects a first line of source code within the codebase. The operations in this example also include determining a first set of tests associated with the first line of source code, wherein the first set of tests is a first subset of a test suite associated with the application. Further, the operations in this example further include mutating the source code change into a mutated source code change, building a mutated application based on the mutated source code change, and executing the first set of tests on the mutated application.

BRIEF DESCRIPTION OF THE DRAWINGS

FIGS. 2A-2D illustrate examples of source code within an application, including an original code fragment and three modified code fragments, in accordance with one or more examples of the present disclosure.

FIG. 3 illustrates a mapping component storing data indicating mappings between portions of source code and associated test cases within an application test suite, in accordance with one or more examples of the present disclosure.

DETAILED DESCRIPTION

Figure 1:
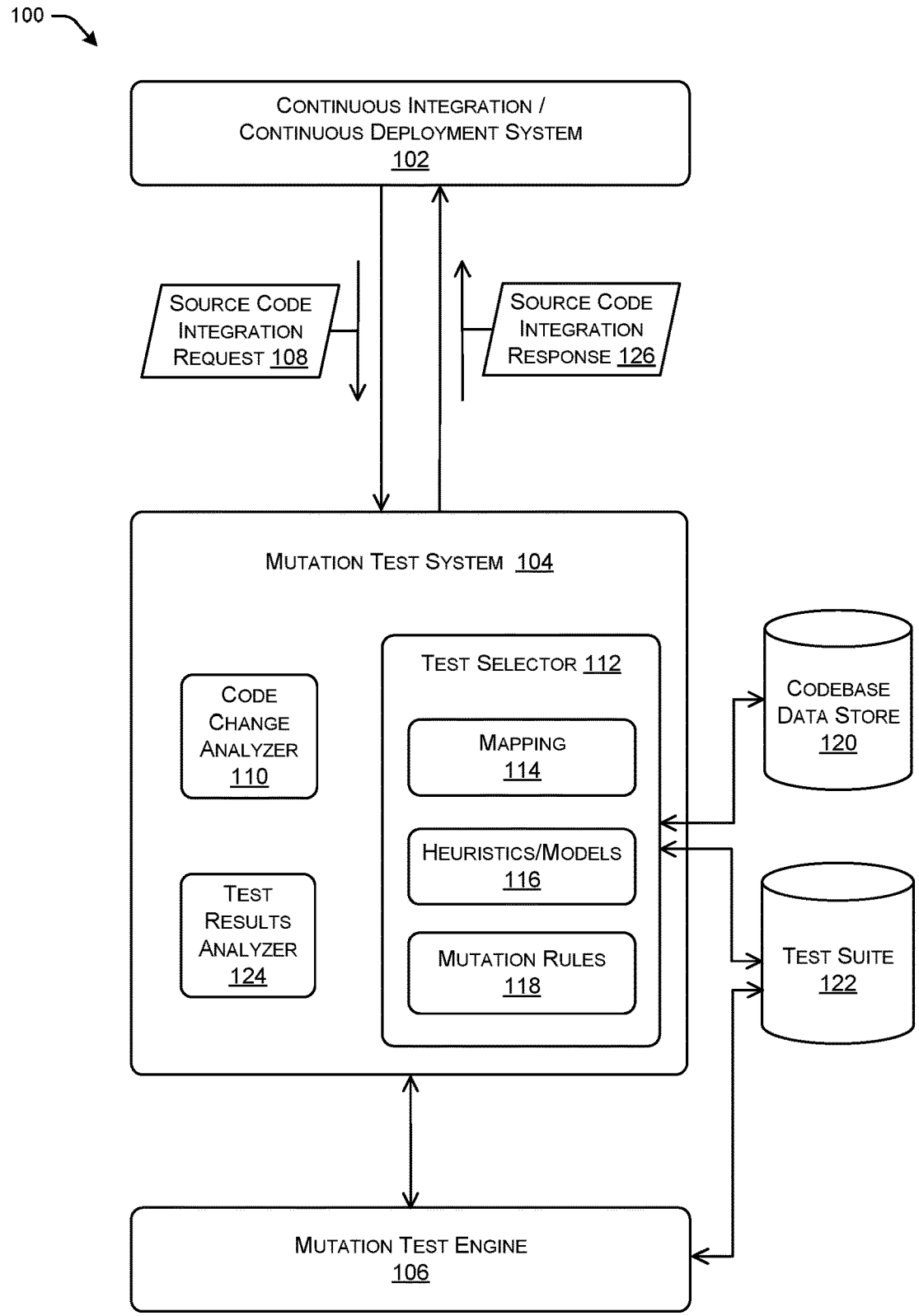
FIG. 1 illustrates a computing environment including a CI/CD system and mutation test system configured to determine and execute mutation testing associated with discreet changes in the source code of an application, in accordance with one or more examples of the present disclosure.

FIG. 1 shows an example of a computing environment 100 configured to perform mutation testing for an application, based on one or more discreet changes in the source code of the software application. The computing environment 100 can include a continuous integration and/or continuous deployment (CI/CD) system 102 associated with the application, a mutation test system 104, and a mutation test engine 106. The CI/CD system 102 may maintain the codebase for the application, for example, within a shared source code repository. The CI/CD system 102 may manage requests from developers to check-out portions of the application source code, which may be copied from the shared source code repository (or codebase) to a local development environment. After the checked-out source code is modified by the developer, the CI/CD system 102 may receive a request from the developer to check-in (or integrate) the modified code back into the application codebase. To integrate the code, the CI/CD system 102 may receive or upload the modified code from the developer's local development environment, and perform the necessary code replacements or overwrites to merge the modified code from the developer into the application codebase within the shared repository. In some cases, the CI/CD system 102 may perform automated compiling, building, and/or testing as part of a code integration process, in order to better verify that the incoming code changes do not break the build or introduce software bugs into the application. As noted above, CI/CD system 102 also may be configured to automatically rebuild and deploy the modified application into a production environment, in response to one or more changes made to the application codebase. However, in some cases the CI/CD system 102 may manage the integration of code changes into the shared repository but need not perform this continuous deployment functionality, and thus the CI/CD system 102 may be referred to as a CI system rather than a CI/CD in some examples.

The mutation test system 104 and the mutation test engine 106 may be configured to determine and perform mutation testing associated with one or more source code changes processed by the CI/CD system 102. As described below in more detail, the mutation test system 104 may determine portions of the application source code affected by the changes processed via the CI/CD system 102. The mutation test system 104 may mutate the affected portions of the source code, and may determine a subset of the overall application test suite on which to execute the mutation tests, based on the source code changes provided by the CI/CD system 102. The mutation test system 104 may use the mutation test engine 106 to perform the determined mutation testing associated with the source code changes, including compiling and building one or more mutated applications (or "mutants") and executing the determine subset(s) of the application test suite on the mutated application(s).

In various implementations, any or all of the components within the computing environment may be implemented within a continuous integration system (e.g., CI/CD system 102), or may be implemented separately from the continuous integration system. In some examples, the CI/CD system 102 may be implemented within a central server managing the shared source code repository for the application, while the mutation test system 104 and/or mutation test engine 106 may be implemented within a local development environment executing on the developer's client system. In these examples, the CI/CD system 102 may manage requests from developer to check-out/check-in portions of the source code from the developer's local environment. As a precondition to checking-in new or modified code, the developer may be required to execute mutation testing within the local environment using the mutation test system 104 and/or the mutation engine 106. The mutation testing results may be reported to the CI/CD system 102 for verification to permit the integration of the code change into the application codebase. Accordingly, in these examples the mutation testing functionality of the mutation test system 104 and the mutation engine 106 may be performed before and/or as a precondition to integrating a requested code change into the application codebase.

In other examples, the mutation test system 104 and/or mutation test engine 106 may be implemented within a central server associated with the CI/CD system 102 and the shared source code repository. For instance, the CI/CD system 102 may provide source code change requests received from developer client systems to the mutation test system 104, which determines and performs mutation testing based on the requested code change using the mutation test engine. In such examples, the mutation testing functionality of the mutation test system 104 and the mutation test engine 106 may be performed either before or after integrating the requested code change into the application codebase.

As these examples illustrate, the techniques described herein provide technical advantages and improvements in software development and environments testing that include a continuous integration (CI) system to manage a shared application codebase. For example, the mutation test system 104 may be configured to execute mutation testing associated with discreet source code changes within the application codebase. The mutation testing based on discreet code changes may be used both to verify the functionality of the code change, as well as the efficacy and test coverage of the automated test suites used to test the application. As described below, the mutation test system 104 may determine particular portions of source code to mutate, and may determine particular subsets of the application test suites to execute, based on particular source code changes. As a result, the mutation testing targeted to the discreet code changes may be performed more quickly and using fewer computing resources, allowing the mutation testing to be performed more efficiently and flexibly during the software development process. For instance, pre-integration mutation testing may be performed in local development environments having fewer computing resources, which allows developers to verify the source code changes and the efficacy of automated test suite(s) before checking in code changes. The CI/CD system 102 also may initiate post-integration mutation testing more efficiently in response to code changes submitted by developers, allowing the software build, test, and development teams to more quickly detect software bugs and/or gaps in the application test coverage, and to associate those deficiencies with particular source code changes.

When the CI/CD system 102 receives a request from a developer to integrate a source code change into the shared codebase for the application, it may transmit data identifying the source code integration request 108 to the mutation test system 104. The source code integration request 108 may include the modified source code itself, such as one or more new or updated source code files, functions, and/or classes. In some examples, the modified source code received from the CI/CD system 102 may include annotations (e.g., code comments, track changes, etc.) or other metadata to identify the specific changed portions of the code that are different from the corresponding code within the shared code repository for the application. Additionally or alternatively, the mutation test system 104 may use a code change analyzer 110 to determine the specific changed portions of the code associated with the source code integration request 108. For instance, the code change analyzer 110 may perform a text comparison between the received source code files/functions/classes, and the corresponding source code files/functions/classes within the application codebase. Based on the metadata and/or code comparisons, the code change analyzer 110 may determine the specific portions of code associated with source code integration request 108. The specific portions of code may be determined at various different levels of granularity, including determining changed classes, functions, and/or specific changed lines of source code associated with the request.

In some examples, the code change analyzer 110 may determine the modified portions of source code, as well as additional portions of code that are not directly modified but may be otherwise affected by the source code integration request 108. For instance, a portion of the application source code might not be modified directly by a requested code change, but may be newly invoked by the code change or may be invoked differently using different types input parameters. Accordingly, the code change analyzer 110 may analyze the source code integration request 108 in the context of the codebase as a whole to determine portions of the source code indirectly affected by the requested code change. In some cases, the code change analyzer 110 may execute a code coverage tool with and without the requested code change, and compare the results to identify the portions of the source code indirectly affected by the source code integration request 108. As noted above the techniques described herein include performing targeted mutation testing associated with code changes, by mutating particular portions of the code associated with the code changes and determining test subsets associated with the particular portions of the code. It can be understood from the context of this disclosure that these techniques may apply to portions of the code directly modified by a code change (e.g., within a source code integration request 108) and/or or portions of the code not modified but indirectly affected by a code change.

The test selector 112 may be configured to determine a subset (or multiple subsets) of the application test suites to be executed during the mutation testing, based on the portions of source code associated with the source code integration request 108. In particular, the test selector 112 may select a set of test cases, including unit tests and/or integration tests, within the automated test suites maintained for the application. As described below in more detail, the test selector 112 may use a mapping component 114 in some instances, to determine a set of test cases associated with the modified and/or affected source code. The mapping component 114 may store and maintain a set of mappings between subsets of tests and corresponding portions of the application source code. The associations between subsets of tests and portions of source code may mapped to various different levels of granularity, including the class level, function level, or source code line level. The mapping component 114 may use one or combination of various techniques to determine associations between the portions of the source code and test subsets. These techniques may include, for example, receiving embedded code comments and/or annotations within the source code, the results of code coverage tools during test executions, input from software developers or testers, and/or historical data from previous mutation testing runs.

Additionally or alternatively, the test selector 112 may use heuristics and/or models 116 to determine the set of test cases associated with the modified and/or affected source code. As described below in more detail, heuristics/models 116 may include trained machine-learned models configured to output sets of tests to be executed within the mutation testing, based on the source code integration request 108. In various examples, the heuristics/models 116 may use the affected source code, as well as various other attributes associated with the source code and/or the mutation test system 104 as input to one or more heuristics-based algorithms or trained models configured to output sets of tests to be run within the mutation testing.

In some examples, the mapping component 114 and/or the heuristics/models 116 also may use a set of mutation rules 118 to determine the test sets to be executed within the mutation testing. Mutation rules 118 may correspond to a set of source code mutation rules to be used when mutating the source code during mutation testing. Mutating a line of source code during mutation testing may be performed either by the mutation test system 104 or the mutation test engine 106 in various examples. The mutation rules 118 may include rules defining how a line of source code is to be mutated. By way of example, mutation rules 118 may include rules for replacing one type of operator with a different type of operator, converting one data type to a different data type, replacing a variable with a predetermined constant value, removing a branching condition within the code, and so on. As described below, in some examples the subset of test cases determined by the test selector 112 may be based in part on the mutation rules 118 used in the mutation testing. For instance, one type of source code mutation may result in one subset of the test suite being executed during the mutation testing, and a different type of source code mutation may result in a different test subset being executed.

When determining which sets of tests are to be executed during the mutation testing based on the source code integration request 108, the mapping component 114 and/or the heuristics/models 116 may use data within a codebase data store 120 as input to the mappings, heuristics, or models. The codebase data store 120 may store the application source code itself and/or various attributes associated with the application codebase. For example, the codebase data store 120 may store data associations representing the relationships between different portions of the source code (e.g., dependencies between classes or functions), metadata associating various portions of the source code with other portions of the source code and/or test subsets, the previous results of test suite runs, the previous results of mutation testing runs associated with different mutated portions or the source code, and/or code coverage data associated with different tests/test suites.

The test suite data store 122 may store the tests themselves, including automated unit tests and/or integration tests designed to test one or more functionalities of the application. Each test in the test suite data store 122 may be a test function, test file, and/or data embodying a particular test case designed by the application development or testing team. In some instances, the test suite data store 122 may store associations between individual tests and classes, functions, and/or other portions of the source code, such as code coverage data associated with the test.

After determining the modified or affected portions of the source code to be mutated, and the subset of tests to be executed, the mutation test system 104 may invoke the mutation test engine 106 to perform the mutation testing. In various examples, the mutation test engine 106 may be implemented within the mutation test system 104, or may be implemented within a separate server accessible via a network.

To perform the mutation testing, the mutation test engine 106 may perform a mutation operation to mutate the source code associated with the integration request 108. As noted above, the particular source code mutated for the mutation testing may be the same code modified by the developer in the associated with the code integration request 108, or may be different source code in the application that is not directly modified but may be potentially affected by the source code change. In some implementations, a mutation test may include making a single mutation to a single line of source code of the application, although multiple different mutation tests may be performed in which different mutations are performed on the same line of code or on a different line of code.

In some cases, the source code mutation performed by the mutation test engine 106 may be based on the mutation rules 118. Different mutation rules 118 may be associated with different CI/CD systems 102, different applications, different test suites, and/or different portions of the source code. For instance, a mutation rule applicable to one source code change may cause a replacement of an "and" logical operator with an "or" logical operator within one line of code. A different example mutation rule may cause a replacement of an "!=" operator with an "==" operator, and another example mutation rule may remove the "else" within an "if . . . else . . . " statement within a line of code. Accordingly, the mutation test engine 106 may receive the modified (or affected) source code associated with the code integration request 108, receive the mutation rules 118, and may mutate one or more lines of the source code into mutated source code.

After mutating the source code, the mutation test engine 106 may compile and/or build a mutated executable version of the application, based on the mutated source code. In some programming languages (e.g., Java®), source code files are compiled into corresponding bytecode class files. In other programming languages (e.g., C++), source code files are compiled and built into machine code. In various different examples, classes in the source code may or may not have a one-to-one relationship with compiled classes. Accordingly, in some cases a mutated source code change may be compiled into a single mutated class file which can be used to replace the original (e.g., unmutated class file). In other cases, compiling the mutated source code change may require compiling and replace multiple different class files. Additionally, certain programming languages, compilers, and/or development environments may permit class recompilation and/or replacement of previously-compiled class files loaded into memory with new recompiled class(es) files during runtime, while other programming languages, compilers, and/or development environments may require recompilation and/or reloading of some or all of the classes of the mutated application.

The mutation test engine 106 then may use the mutated application to perform the targeted mutation testing associated with the code integration request 108. For example, the mutation test engine 106 may execute the mutated application, which incorporates the functionality of the mutated source code change, and run the subset of associated tests determined by the test selector 112, on the mutated application. If one or more of the test cases within the subset fails due to the mutation introduced into the source code, the mutated application may be considered to have been "killed." In contrast, if the entire subset of the test cases succeeds despite the mutation introduced into the source code, the mutated application may be considered to have "survived." As discussed above for mutation testing, a failure of a test against a mutated application may indicate that the test successfully detected and "killed" the mutated application, thus indicating that the test operates as intended and successful detects errors in the application. However, if a test does not fail despite the mutated source code change that causes the mutated application to produce an unintended output, the success of the test case and its inability to kill the mutated application may indicate that the test is inadequate to sufficiently test the application. The development or test team for the application may respond by altering the test, or writing new test that may better test for the unintended output.

In some cases, multiple different mutated source code changes may be generated, and multiple mutated applications may be compiled and/or built based on the mutated source code changes. For each mutated application, the mutation test engine 106 may execute the determine subset of the test suite on the mutated application, to determine whether or not the subset of tests "killed" the mutated application. An overall quality level of the determined subset of tests can be determined based on a number or percentage of different mutated applications that were killed by the subset of tests. For example, if the subset of tests killed 95% of mutated applications based on source code change from a developer, then subset of test cases may be considered to have a relatively high quality. However, if the subset of tests only kills 40% of mutated applications, the subset may be considered to have a relatively poor quality. In some instances, a relatively poor quality test subset may be a function of the particular subset of tests determined by the test selector 112, in which case the test results analyzer 124 may instruct the test selector 112 to increase the size of the subset and/or use other techniques or criteria to determine a different subset of tests associated with the code integration request 108. In other instances, a relatively poor-quality test subset may be a function of the quality (e.g., test coverage) of the test suite as a whole, in which case the test results analyzer 124 may output errors and/or recommendations to the development and/or test team to revise the test suite to kill a higher percentage of mutated applications, and thereby detect a wider range of errors or other issues associated with the application.

The test results analyzer 124 may receive and aggregate the results of the mutation testing performed by the mutation test engine 106. For example, for a single mutated application the test results analyzer 124 may determine a number and/or a percentage of the tests within the determined test subset that cause the mutated application to be killed. When multiple mutated applications are generated and tested, the test results analyzer 124 may determine the number or percentage of the mutated applications that were killed by running the subset of tests. As noted above, larger numbers or percentages of the mutated applications that are killed may indicate that the subset of tests used in the mutation killing is of a relatively higher quality, while smaller numbers or percentages of the mutated applications that are killed may indicate that the subset of tests is of a relatively lower quality.

In some examples, the test results analyzer 124 may determine a response 126 to the source code integration request 108, based on the various results of the mutation testing. When the mutation test results meet or exceed a predetermined threshold (e.g., a single generated mutated application is killed, or a threshold number or percentage of multiple mutated applications are killed, etc.), the test results analyzer 124 may transmit a response 126 indicating that the CI/CD system 102 is permitted to initiate an operation to integrate the requested source code change into the shared repository of the application codebase. In contrast, if the mutation test results do not exceed a predetermined threshold, the test results analyzer 124 may transmit a response 126 delaying or prohibiting the integration of the requested source code change. In such examples, the CI/CD system 102 may require additional test coverage associated with the changed portion of the source code, before permitting the requested code change to be integrated into the codebase.

FIGS. 2A-2D show four examples of source code fragments associated with an application. In this example, FIG. 2A may correspond to a source code change submitted by a developer and/or included within a source code integration request 108, and FIGS. 2B-2D may represent three different mutations of the source code change. As noted above, mutations of source code fragments may be performed by the mutation test system 104 and/or the mutation test engine 106. The mutated source code fragments may be used in mutation testing, by compiling and/or building the mutated source code into mutated applications. For a particular source code change made by a developer, the mutation test system 104 may generate and test a single mutated application based on a single mutated source code fragment, or may generate and test multiple mutated applications based on multiple mutated source code fragments.

Various different techniques may be used for mutating a fragment of source code associated with (e.g., directly modified or otherwise affected by) a source code change from a developer. In various examples, the mutation test system 104 may mutate source code by replacing an operator with a different operator within a program statement, inserting a new operator into a program statement, replacing an operand (e.g., variable or constant value) with a different operand in a program statement. In other examples, the mutation test system 104 may modify, add, or remove portions of a program statement in order to mutate a source code fragment.

As noted above, source code mutations may be determined based on the mutation rules 118 in some examples. In some cases, the mutation rules 118 may be a predetermined and common set of mutation rules associated with the mutation test system 104 and/or mutation test engine 106. In other examples, the mutation rules 118 may include different mutation rules associated with different applications, developers, CI/CD systems, and/or different attributes of the source code changes (e.g., the number of changes, types of changes, etc.). In such examples, the mutation test system 104 may determine a unique set of the mutation rules 118 based on the particular source code integration request 108.

In FIG. 2A, source code fragment 200 may represent a source code change submitted by a developer to the CI/CD system 102. The source code change may be provided to the mutation test system 104 within the source code integration request 108, and the mutation system may use the mutation rules 118 to generate one or more mutated source code fragments based on the source code fragment 200. In FIG. 2B, source code fragment 202 is a first mutated source code fragment, in which the ">=" operator on line 23 has been replaced with a "<" operator 204. In FIG. 2C, source code fragment 206 is a second mutated source code fragment, in which the "--" operator on line 26 has been replaced with a "++" operator 208. In FIG. 2C, source code fragment 210 is a third mutated source code fragment, in which the "else" statement on line 25 has been removed using "//" comment indicators 212. Although only three mutated source code changes are shown in this example, it can be understood that any number of additional source code mutations can be determined in other examples.

FIG. 3 shows an example mapping component 114 storing data indicating a set of associations between different portions of source code in an application, and subsets of tests within the application test suite. As noted above, a mutation test system 104 may create and use association tables, such as table 300, which maintain mappings between portions of the application source code and test subsets. In this example, table 300 supports mappings between application classes, functions, and/or lines of source code, and corresponding subsets of test cases. In other examples, mappings may be maintained only at higher levels of granularity (e.g., classes, functions, source files, etc.). In some instances, mappings such as those in table 300 also may include associations between specific mutation rules and subsets of tests cases. For instance, a first portion of the source code (e.g., a function or line) in the application may be mapped to a first subset of tests when one set of mutation rules 118 is used, but may be mapped to a second subset of tests when a different set of mutation rules 118 is used.

In various implementations, the mutation test system 104 may use historical mutation testing data to create and maintain the mappings between portions of the source code and subsets of test cases. As an example, if a mutation testing run was previously performed during which a first class/function/line of the source code was mutated, and the result was that the mutated application was killed by five different test cases, then the test selector 112 may add a row into table 300 mapping the first class/function/line to the five different test cases. In this example, if a subsequent mutation testing run was previously performed during which the first class/function/line of the source code was mutated again, and the result was that the mutated application was killed by ten new test cases, then the test selector 112 may update the row in table 300 for first class/function/line to include the ten new cases into the listing of associated test cases. Using these techniques, the mutation test system 104 may generate and maintain mappings between different portions of the application source code and different subsets of tests, based on the previous results of mutation testing runs.

Additionally or alternatively, the mutation test system 104 may use other techniques to determine mappings between different portions of source code and subsets of tests. For instance, the mutation test system 104 may provide an interface (e.g., GUI or programmatic) to receive input from a developer or tester that indicates associations between particular test cases and particular lines, functions, and/or classes of the source code. The mutation test system 104 may update the mappings in table 300 based on such inputs from developers or testers. In some examples, the application source code may be annotated with code comments identifying particular test cases that are relevant to the annotated portions of the code. In such examples, the mutation test system 104 may scan source code files to identify such annotations, and then update the mappings in table 300 to associate the annotation portions of the source code with the test cases identified in the annotations. Additionally, in some cases the mutation test system 104 may use code coverage data to determine mappings between portions of the source code and subsets of test cases. For example, a code coverage tool (e.g., within the mutation test system 104 or external to the mutation test system 104) may be run while executing a test suite on the application, and the code coverage results (e.g., classes, functions, and lines covered) associated with each test case may be stored as associations within the mapping table 300.

As discussed above, the mutation test system 104 may use the associations between portions of source code and subsets of tests to perform targeted mutation testing associated with a source code change. After receiving the source code integration request 108, the mutation test system 104 may determine the modified (or otherwise affected) portions of the source code changed by the developer. The mutation test system 104 then may use a table 300 (or other data structure) stored within the mapping component 114 to determine the subset of tests associated with the changed portions of source code.

Figure 4:
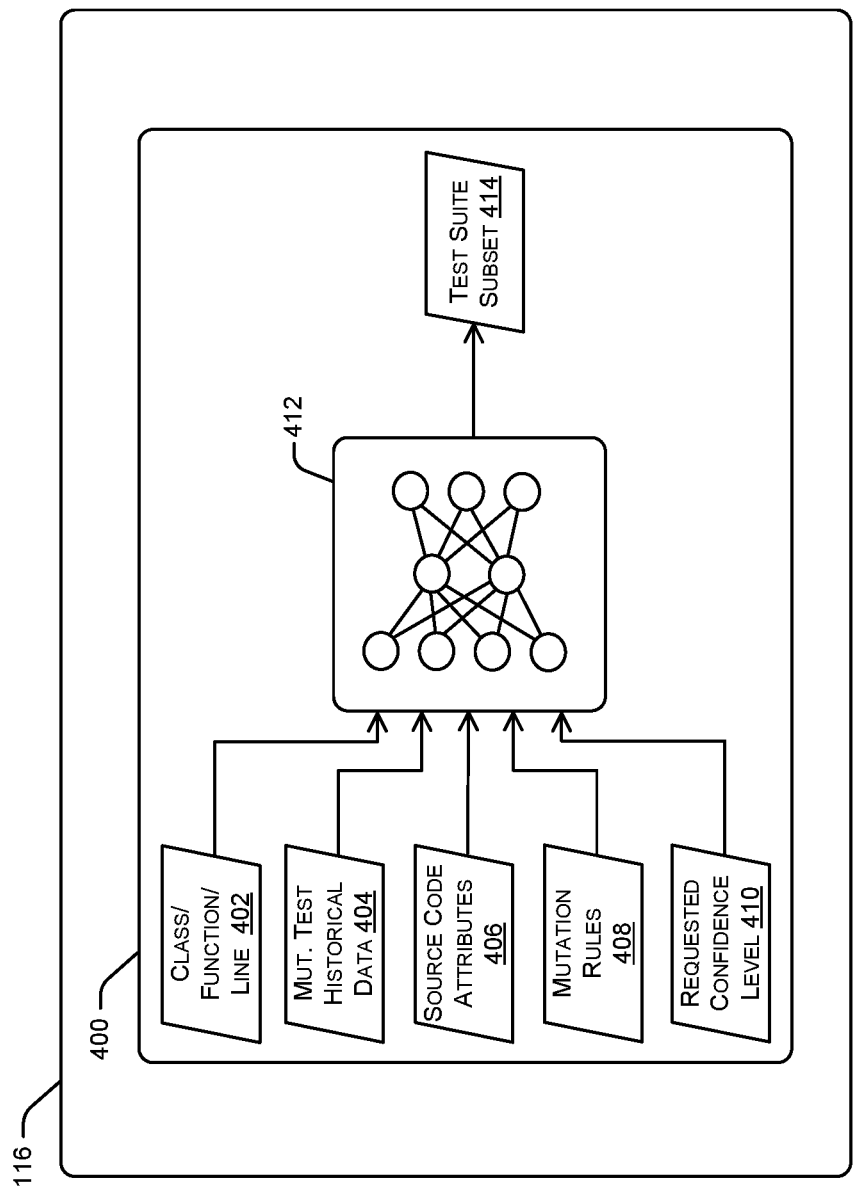
FIG. 4 illustrates example heuristics and/or model component, including an example of machine-learned model configured to output a test suite subset associated with a change to an application codebase, in accordance with one or more examples of the present disclosure.

FIG. 4 shows an example heuristics/modeling component 116 configured to output a subset of test cases associated with a source code change. As noted above, in various implementations the heuristics/models 116 may be used instead of, or in combination with, the mapping component 114, to determine associations between different portions of source code in an application and subsets of tests within the application test suite. As an example, if a particular portion of the source code has not previously been mutated for mutation testing (has not been mutated in a particular way), and/or if the mapping component 114 does not include any associations between the source code and a test subset, then the mutation test system 104 may invoke heuristics/models 116 instead of the mapping component 114 to determine the test subset for the mutation testing.

In this example, a machine-learned model 400 is depicted that is configured to receive inputs 402-410 and use a trained neural network 412 to process the inputs and provide a test suite subset 414 as an output. Although only one machine-learned model 400 is shown in this example, in other examples the heuristics/models 116 may include multiple different models and/or other heuristics-based algorithms, each of which may be configured to receive any combination of the input data described herein relating to the source code integration request 108, and may be configured to output an associated set of test cases to be used in the mutation testing.

The mutation test system 104 may generate and train the machine-learned model 400, using as training data any combination of the data described herein relating to the source code changed or affected by a code integration request 108. For example, the mutation test system 104 may train the machine-learned model 400 based on historical mutation testing data, including the results of previous mutation testing runs associated with different source code mutations. In such examples, the input training data may include the mutated portion of the source code (e.g., a class, function, and/or line), the type of mutation (e.g., mutation rules 118 applied), and the results of the mutation test including which test cases in the suite killed or did not kill the mutated application. Additionally or alternatively, the mutation test system 104 may train the machine-learned model 400 based on code coverage data, such as the code coverage results (e.g., classes, functions, and lines covered) associated with different test cases in the suite. In various examples, the mutation test system 104 also may train the machine-learned model 400 based on mutation rules 118, input from developers/testers, code annotations, and/or determined attributes associated with particular portions of the source code.

When using a machine-learned model 400, or other heuristics/models 116 to determine a set of test cases to execute based on a source code change, the mutation test system 104 may analyze the source code integration request 108 and the attributes of the modified (or otherwise affected) source code in the application, to determine the various inputs to provide the machine-learned model 400. In this example, the machine-learned model 400 is configured to receive input data including source code class/function/line data 402, mutation test historical data 404, source code attribute data 406, mutation rules 408, and/or a requested confidence level 410. The source code class/function/line data 402 may include data indicating any portion(s) of the source code that are modified or otherwise affected by the source code integration request 108.

The mutation test historical data 404 may include the inputs and results of previous mutation testing, such as the mutated portions of the source code, the types of mutations performed, and the corresponding results of the mutation testing (e.g., mutated applications killed or not killed by various tests in the test suite). In some cases, the trained model 400 may use similarities between previous mutation test runs within the mutation test historical data 404, even if the previous mutation test runs involved mutating different portions of the source code, to determine the test suite subset 414.

The source code attribute data 406 may include any attributes of the source code associated with the source code integration request 108. In addition to the location of the source code within the application codebase (e.g., class, function, source code file, line, etc.), the source code attribute data 406 may include attributes such as the types of programming statements and operators used, whether or not the source code invokes an internal function or external class function, whether or not the source code is part of an "if else" statement or programming loop, whether or not the source code invokes and/or modifies a global variable, whether or not the source code writes to a particular memory device or invokes a particular device driver, and so on.

The mutation rules 408 may correspond to set of mutation rules 118 applied by the test selector 112. As noted above, the test selector 112 may apply a common predetermined set of mutation rules in some cases, or may apply different sets of mutation rules depending on the application, the portions of the source code modified, the developer submitting the code change, and/or other factors. Because the types of mutation rules 118 used to perform the mutation test may affect which test cases kill and the mutated application and which do not, the particular mutation rules applied by the test selector 112 may be provided as input and may affect the test suite subset 414 determined by the machine-learned model 400.

The requested confidence level 410 may correspond to a desired level of assuredness or quality for the mutation testing to be performed by the mutation test system 104 and mutation test engine 106. In general, when the test selector 14 selects a larger subset of test cases, the mutation testing has a higher likelihood of detecting when the mutated applications will be killed by the full test suite. In contrast, when the test selector 14 selects a smaller subset of test cases, the mutation testing has a lower likelihood of detecting when the mutated applications will be killed by the full test suite (e.g., a false negative condition). However, larger subsets of test cases generally take longer to run, and when the subset of test cases is too large it may be impractical or impossible to run the full subset of test cases within the development environment and/or to perform the code integration efficiently. Therefore, the test selector 112 may determine a requested confidence level 410 that corresponds to a combination of the number of tests and/or quality of tests (e.g., likelihood to kill the mutated application) that the machine-learned model 400 is to output. The requested confidence level 410 may allow the test selector 112 to configure speed and quality of the mutation testing on-the-fly, based on the mutation testing requirements associated with the application codebase and the CI/CD system 102.

Although a simplified example of a neural network 412 is depicted in this example, the machine-learned model 400 may be implemented using various neural network data structures having one or more levels, different node configurations, randomly assigned initial node weights, and a training component that uses one or more regression algorithms, instance-based algorithms, Bayesian algorithms, decision tree algorithms, clustering algorithms artificial neural network algorithms, and/or deep learning algorithms, to train the machine-learned model 400. The machine-learned model 400 may implement various machine-learning algorithms including, but not limited to, regression algorithms instance-based algorithms, decision tree algorithms, Bayesian algorithms, clustering algorithms, association rule learning algorithms, deep learning algorithms supervised learning, unsupervised learning, semi-supervised learning, etc.

Figure 5:
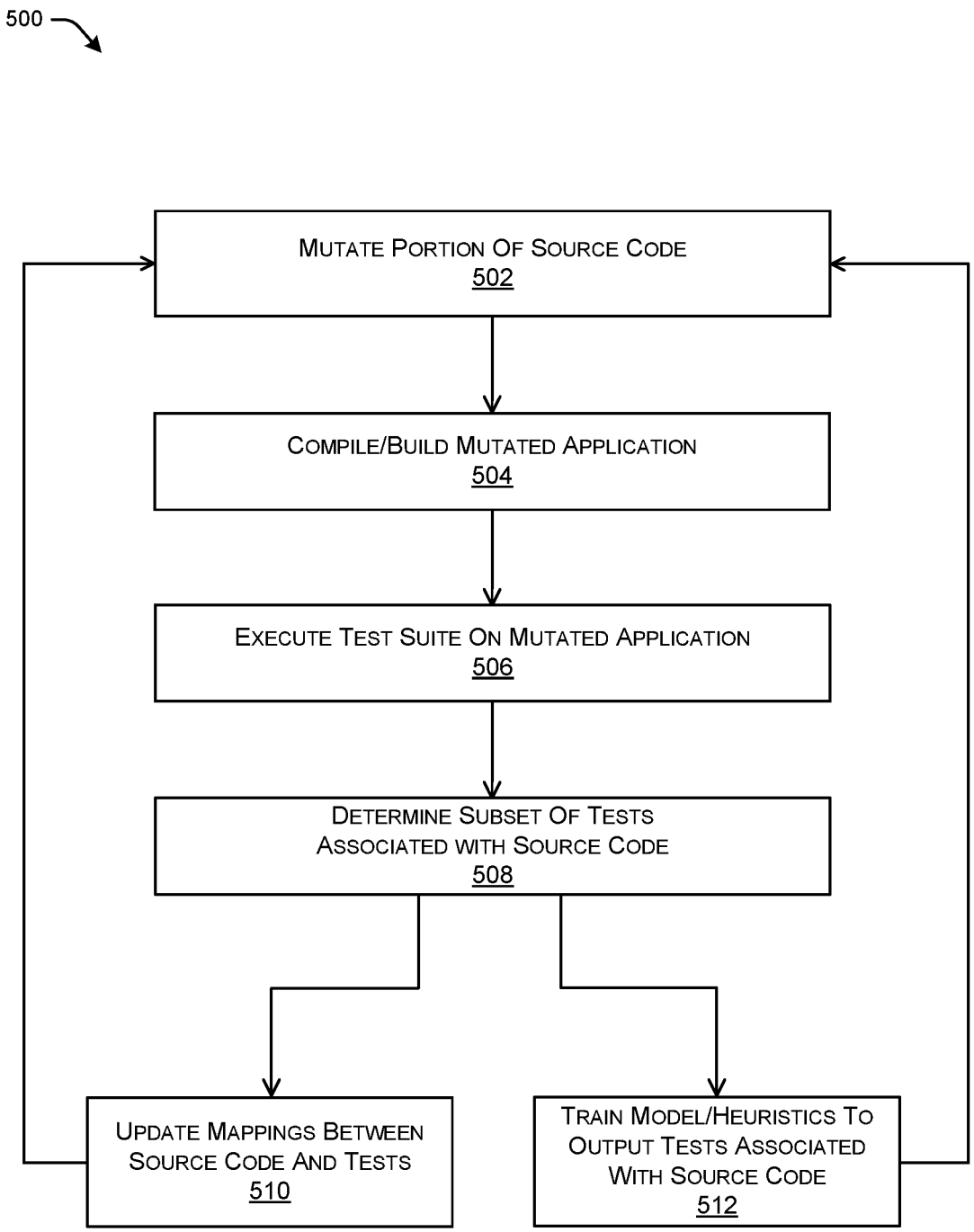
FIG. 5 illustrates an example process of determining and generating mappings and/or models/heuristics configured to output sets of test cases associated with code changes in an application codebase, in accordance with one or more examples of the present disclosure.

FIG. 5 is a flow diagram illustrating a process 500 of determining and generating mappings and/or heuristics/models configured to output sets of test cases associated with source code changes. In some examples, process 500 may be used to generate and maintain one or more tables (e.g., table 300) within a mapping component 114 to store associations between particular portions of the application source code (e.g., classes, functions, files, and/or source code lines) and corresponding subsets of test cases in the application test suites. Additionally or alternatively, process 500 may be used to generate and train one or more machine-learned models or heuristics-based algorithms (e.g., model 400) within heuristics/models 116 that is configured to output a subset of the application test suites associated with a particular source code change.

In the examples discussed in connection with process 500, a mapping data within a mapping component 114 and/or heuristics/models 116 may be generated and maintained based on the results of mutation testing performed iteratively in operations 502-508. However, as discussed above, the associations between portions of the source code and subsets of tests embodied within the mapping component 114 and the heuristics/models 116, may be determined based on other types of data and/or other analyses techniques. For instance, in other cases the associations within the mapping component 114 and heuristics/models 116 may be based on code annotation, test cases annotation, code coverage test run results, and/or input from developers and/or testers, any or all of which may be used in combination with the results of mutation testing described in this example.

At operation 502, the mutation test system 104 may mutate a portion of the application source code as part of a mutation testing run performed on the application. In some cases, the mutation test system 104 may perform a single alteration to a single line of source code when performing a mutation test. The line of source code mutated in operation 502 may or may not be associated with a code change from a developer (e.g., a source code integration request 108). As noted above, process 500 relates to determining associations between portions of the source code and subsets of test cases, but need not be performed in connection with any code change. Mutating a line of source code in operation 502 may include using one or more mutation rules 118 to define how a line of source code is to be mutated. As discussed above, possible source code mutations may include replacing or adding an operator in a program statement, replacing an operand in a program statement, or modifying, adding, or removing portions of a program statement.

At operation 504, the mutation test system 104 may compile and/or build a mutated application incorporating the source code mutated in operation 502. Depending on the programming language(s) of the source code and application, operation 504 may include compiling the mutated source code file into corresponding bytecode and/or machine code. Additionally, the source code mutated in operation 502 may have one-to-one or one-to-many relationship the executable classes of the application. Therefore, the mutated source code file may be compiled and/or built into a single mutated class file, or may be compiled into multiple different class files. The mutation test system 104 may replace the mutated class files (and/or may recompile and reload additional class files as needed) to generate the mutated application to be used in the mutation testing.

At operation 506, the mutation test system 104 (and/or the mutation test engine 106) may execute one or more application test suites on the mutated application. In some cases, entire application test suites may be executed in operation 506, while in other cases only subsets or portions of the application test suites may be executed. For instance, although process 500 may be performed before any associations have been determined between portions of source code and subsets of tests, it also may be performed before after such associations have been determined. In these cases, operation 506 might not include running an entire application test suite, and instead the mutation test system 104 may run only the previously associated subset of tests in order to confirm and verify the associations. During the execution of tests (e.g., unit tests and/or integration tests) on the mutated application, the mutation test system 104 may determine which test cases, if any, fail as a result of the mutation introduced into the source code. When one or more of the test cases fails when run against mutated application, the mutated application is considered to have been killed. In contrast, when all test cases succeed despite the mutation introduced into the source code, the mutated application is considered to have survived the mutation test run.

At operation 508, the mutation test system 104 may use the results of the mutation testing performed in operation 506, to determine a subset of tests associated with the source code. For example, the test results analyzer 124 may receive and aggregate the results of the mutation testing from the mutation test engine 106, and may determine which test cases (if any) failed the mutation testing, and thus were responsible for killing the mutated application. In some cases, the mutation test system 104 may associate each of the failing mutation test cases with the particular portion of the source code mutated in operation 502.

After determining associations in operation 508 between the mutated portion of the source code and one or more tests, one or both of operations 510 and 512 may be performed, based on the determined associations. For example, a mutation test system 104 may include a mapping component 114 without any heuristics and/or models to manage associations between portions of source code and subsets of tests. In these examples, process 500 may include operation 510 and not operation 512. In other examples, the mutation test system 104 may include no mapping component but heuristics/models 116 to manage the associations between portions of source code and subsets of tests, in which case the process 500 may include operation 512 and not operation 510. As described, in still other examples the mutation test system 104 may include both a mapping component 114 and heuristics/models 116, which may be used individually or in combination to manage and determine associations between portions of source code and subsets of tests. In these cases, process 500 may include operations 510 and 512, which may be performed in parallel or one after another.

In operation 510, the mutation test system 104 may define or update a set of associations (e.g., mapping in table 300) between the portion of the source code mutated in operation 502, and the subset of test cases determined in operation 508. For example, if the results of the mutation test run in operation 508 indicated that the mutated application was killed by three different test cases, then in operation 510 the test selector 112 may add or update a row in a mapping table that associates the mutated class, function, and/or line of source code with the three test cases. In operation 512, the mutation test system 104 may use the portion of the source code mutated in operation 502 and the subset of test cases determined in operation 508 as training data to a model (e.g., machine-learned model 400) or a heuristics-based algorithm. In some examples, the mutation test system 104 may store and/or aggregate mutation test run data from multiple iterations of operations 502-508, and then may initiate a model training process with the aggregation of stored mutation testing data.

Figure 6:
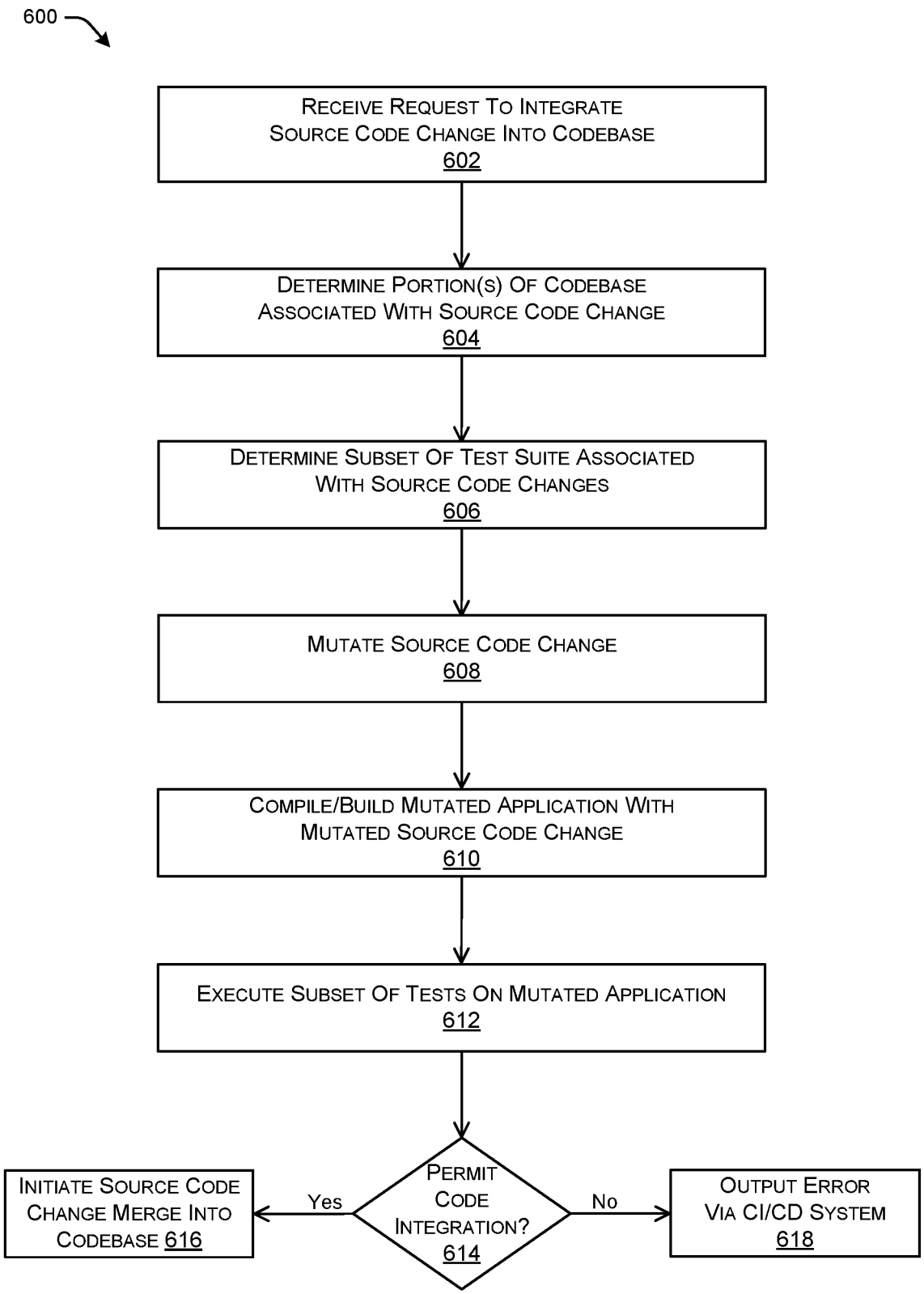
FIG. 6 illustrates an example process of determining and executing mutation testing based on a request to integrate a source code change into an application codebase, in accordance with one or more examples of the present disclosure.

FIG. 6 is a flow diagram illustrating a process 600 of determining and executing mutation testing associated with request to integrate a source code change into an application codebase. As described below, process 600 may include accessing and using previously determined associations between portions of source code and subsets of tests. These previously determined associations may correspond to mappings (e.g., table 300) within a mapping component 114, or may correspond to the output of a machine-learned model (e.g., model 400) or heuristics-based algorithms maintained by the test selector 112 as heuristics/models 116. In some cases the operations of process 600 may be performed by a mutation test system 104, in response to a source code integration request 108 received from a CI/CD system 102, that identifies a source code change that may potentially occur or has occurred within the shared repository of the application codebase.

At operation 602, the mutation test system 104 may receive a request to integrate a source code change into the application codebase. In some cases, request may correspond to a source code change request, such as the source code integration request 108 described above. The request may include the modified source code itself, such as one or more new or updated source code files, or alternatively may include data identifying the location of the source code change (e.g., classes, functions, files, and/or lines) within the application codebase. As noted above, the request may be received from the CI/CD system 102 in response to a request from a developer to integrate a source code change into the shared code repository for the application. In various cases, the requested in operation 502 may be received either before or after the CI/CD system 102 has integrated the source code change into the shared code repository. For instance, in some cases performing a mutation testing run as described in operations 602-612 may be a precondition to integrating a requested source code change. In other cases, a requested source code change may be integrated into the shared code repository, after which the targeted mutation testing run associated with the code change may be performed via operations 602-612.

At operation 604, the mutation test system 104 may determine one or more portions of the application code base associated with the requested source code change. In some examples, the mutation test system 104 may invoke a code change analyzer 110 to perform text comparison between the received source code files/functions/classes, and the corresponding source code files/functions/classes within the existing application codebase. Additionally, as noted above the determination of the source code associated with the requested source code change may include both source code directly modified by the change, and/or additional portions of code that are not directly modified by the change but may be otherwise affected by the change (e.g., newly invoked code, code invoked in a different manner or with different inputs by the change, etc.)

At operation 606, the mutation test system 104 may determine a subset of the application test suite associated with the source code changes. As described above, the mutation test system 104 may use the test selector 112 to determine the subset of tests, using one or a combination of various different techniques. In some cases, the test selector 112 may use a mapping component 114 that stores associations between portions of source code and subsets of tests. After determining the associated source code in operation 604, the test selector 112 may access a table 300 or other data structure stored within the mapping component 114, to retrieve the previously determined subset of tests associated with the source code. Additionally or alternatively, the test selector 112 may use heuristics/models 116 configured to output associated sets of test case based on inputs from a source code change/integration request. For instance, the test selector 112 may analyze the source code integration request, attributes of the associated source code in the application and various other data (e.g., mutation rules, code coverage data), to determine inputs to provide a trained model or heuristics-based algorithm configured to output a subset of the application test suite.

At operation 608, the mutation test system 104 may mutate the source code associated with the requested source code change received in operation 602. In some cases, the mutation test system 104 may perform a single alteration to a single line of the source code associated with the source code change/integration request. The mutation of the line(s) of source code in operation 602 may include performing a mutation in accordance with the mutation rules 118, such as replacing or adding an operator in a program statement, replacing an operand in a program statement, and/or modifying, adding, or removing portions of a program statement.

At operation 610, the mutation test system 104 may compile and/or build a mutated application incorporating the source code mutated in operation 608. As discussed above, when various programming language(s) are used for the source code, operation 608 may include compiling and/or building the mutated source code into corresponding bytecode and/or machine code. The mutation test system 104 may compile, build, and load one or more executable class files, as needed, to generate the mutated application to be used in the mutation testing.

At operation 612, mutation test system 104 (and/or the mutation test engine 106) may execute the subset of the application test cases determined in operation 606, against the mutated application generated in operation 610. During the execution of tests (e.g., unit tests and/or integration tests) on the mutated application, the mutation test system 104 may determine which test cases, if any, fail as a result of the mutation introduced into the source code. When one or more of the test cases fails when run against mutated application, the mutated application is considered to have been killed. In contrast, when all test cases succeed despite the mutation introduced into the source code, the mutated application is considered to have survived the mutation test run.

At operation 614, the mutation test system 104 may evaluate the results of the mutation testing performed in operation 612, and determine whether or not the requested source code change is permitted to be integrated into the shared source code repository of the application. In some examples, if the mutated application is killed in operation 612, then the mutation test system 104 may determine that the test coverage is sufficient for the source code change/integration request, and may permit the integration of the source code change into the application codebase (614:Yes). In contrast, if the mutated application is not killed in operation 612, then the mutation test system 104 may determine that the test coverage is not sufficient for the source code change/integration request, and might not permit the integration of the source code change into the application codebase (614:No).

In other examples, the evaluation of the mutation test results in operation 614 may involve evaluating multiple mutated applications and/or multiple results from individual test cases, after which the determination in operation 614 may be performed using one or more thresholds. For instance, when multiple mutated applications are generated in operations 608-610, the mutation test results include the number or percentage of the mutated applications that were killed. This number or percentage may be compared to a threshold to determine whether or not to permit the source code integration. Additionally, in some cases the mutation test results may include the number or percentage of distinct test cases that kill a mutated application, and the number or percentage or test cases may be compared to a different threshold to determine whether or not to permit the source code integration.

Based on one or a combination of the test results and threshold criteria, when the mutation test system 104 determines that the mutation test coverage for the requested source code change is sufficient (614:Yes), then in operation 616 the mutation test system 104 may initiate the integration (or merging) of the source code change into the shared code repository for the application. In some instances, the mutation test system 104 may transmit a response 126 indicating that the CI/CD system 102 is permitted to initiate an operation to integrate the requested source code change into the shared repository.

In contrast, when the mutation test system 104 determines that the mutation test coverage for the requested source code change is insufficient (614:No), then in operation 618 the mutation test system 104 may output an error to one or more external systems indicating the failure or insufficiency of the mutation testing for the source code change. For example, the error output in operation 618 may be directed to development or test team associated with the application, to indicate that the additional test coverage may be required for the portion of the source code associated with the code integration request. As shown in this example, in some cases the sufficiency of the mutation testing coverage of a portion of the source code may be a precondition to permitting a source code change to be integrated into the shared code repository of the application. However, in other examples, the mutation test system 104 and/or the CI/CD system 102 may determine that a source code change request may be integrated into the shared code repository even when the evaluation of the mutation testing indicates insufficient coverage of the associated portions of the source code. For instance, in such cases the mutation test system 104 and/or the CI/CD system 102 may permit the code integration request, but also may automatically initiate an operation to generate additional test cases covering the affected portions of the source code, and/or may transmit a report identifying the portions of the source code with insufficient test coverage, to a development or test team for the application.

Figure 7:
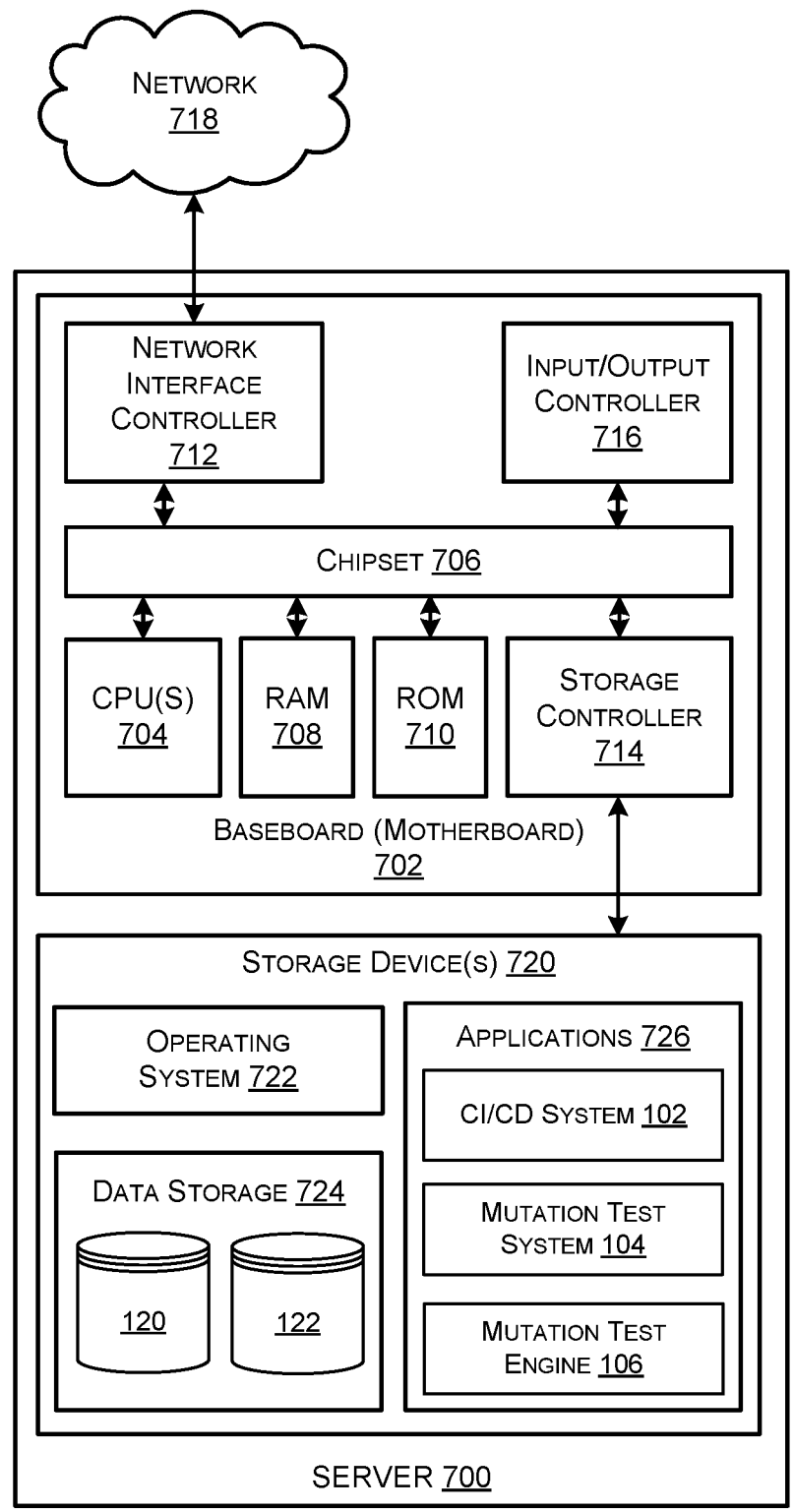
FIG. 7 is an example architecture of a computer server capable of executing program components for implementing various techniques described herein.

FIG. 7 shows an example architecture of a computer server 700 capable of executing program components for implementing the various functionality described herein. Although the computer architecture in this example is labeled as a server, it can be understood from this disclosure that similar or identical computer architectures may be implemented via workstations, desktop or laptop computers, tablet computers, network appliances, mobile devices (e.g., smartphones, etc.) or other computing device, and/or virtual machines or cloud-based computing solutions, any or all of which may execute any combination of the software components described herein. The server 700 may, in some examples, correspond to any of the computing systems or devices described above, such as a CI/CD system 102, a mutation test system 104, a mutation test engine 106, an operator device, and/or any other computing devices, systems, or components executing the software components described herein. It will be appreciated that in various examples described herein, a server 700 might not include all of the components shown in FIG. 7, may include additional components that are not explicitly shown in FIG. 7, and/or may utilize a different architecture from that shown in FIG. 7.

The server 700 includes a baseboard 702, or "motherboard," which may be a printed circuit board to which a multitude of components or devices are connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the server 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the server 700. The chipset 706 can further provide an interface to a computer-readable storage medium such as a ROM 710 or non-volatile RAM ("NVRAM") for storing basic routines that help to startup the server 700 and to transfer information between the various components and devices. The ROM 710 or NVRAM can also store other software components necessary for the operation of the server 700 in accordance with the configurations described herein.

The server 700 can operate in a networked environment using logical connections to remote computing devices and computer systems through a network, such as the network 718, which may be similar or identical to any of the communication networks discussed above. The chipset 706 also may include functionality for providing network connectivity through a Network Interface Controller (NIC) 712, such as a gigabit Ethernet adapter. The NIC 712 is capable of connecting the server 700 to other computing devices (e.g., operator devices, external software development environments, test systems, cloud-based deployment systems, etc.) over the network 718. It should be appreciated that multiple NICs 712 can be present in the server 700, connecting the computer to other types of networks and remote computer systems. In some instances, the NICs 712 may include at least on ingress port and/or at least one egress port.

The server 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device.

The server 700 can include one or more storage device(s) 720, which may be connected to and/or integrated within the server 700, that provide non-volatile storage for the server 700. The storage device(s) 720 can store an operating system 722, data storage systems 724, and/or applications 726, which may include any or all of the systems and/or components described herein. The storage device(s) 720 can be connected to the server 700 through a storage controller 714 connected to the chipset 706. The storage device(s) 720 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server 700 can store data on the storage device(s) 720 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device(s) 720 are characterized as primary or secondary storage, and the like.

For example, the server 700 can store information to the storage device(s) 720 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server 700 can further read information from the storage device(s) 720 by detecting the physical states or characteristics of one or more particular locations within the physical storage units.

In addition to the storage device(s) 720 described above, the server 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the server 700. In some examples, the various operations performed by the computing systems described herein (e.g., CI/CD system 102, mutation test system 104, mutation test engine 106 etc.) may be implemented within a datacenter including one or more servers or devices similar to server 700. For instance, some or all of the operations described herein may be performed by one or more server 700 operating in a networked (e.g., client-server or cloud-based) arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device(s) 720 can store an operating system 722 utilized to control the operation of the server 700. In some examples, the operating system 722 comprises a LINUX operating system. In other examples, the operating system 722 comprises a WINDOWS® SERVER operating system from MICROSOFT Corporation of Redmond, Washington. In further examples, the operating system 722 can comprise a UNIX operating system or one of its variants. It should be appreciated that other operating systems can also be utilized. The storage device(s) 720 can store other system or application programs and data utilized by the server 700.

In various examples, the storage device(s) 720 or other computer-readable storage media is encoded with computer-executable instructions which, when loaded into the server 700, transform the computer from a general-purpose computing system into a special-purpose computer capable of implementing various techniques described herein. These computer-executable instructions transform the server 700 by specifying how the CPUs 704 transition between states, as described above. In some examples, the server 700 may have access to computer-readable storage media storing computer-executable instructions which, when executed by the server 700, perform the various techniques described herein. The server 700 can also include computer-readable storage media having instructions stored thereupon for performing any of the other computer-implemented operations described herein.

As illustrated in FIG. 7, the storage device(s) 720 may store one or more data storage systems 724 configured to store data structures and other data objects. In some examples, data storage systems 724 may include one or more data stores, which may be similar or identical to the codebase data store 120 and/or the test suite data store 122 described above. Additionally, the software applications 726 stored on the server 700 may include one or more client applications, services, and/or other software components. For example, application(s) 726 may include any combination of the components 110-118 and 124 discussed above in relation to the mutation test system 104, and/or other software components described above in reference to FIGS. 1-6.

As illustrated by the above examples, the techniques described herein provide various technical advantages that improve continuous integration (CI) systems and/or continuous integration and continuous deployment (CI/CD) systems, by implementing mutation testing associated with discreet source code changes within the codebase of the application. As described above, various mutation testing techniques may be used to verify the functionality of source code modifications, as well as the efficacy and coverage of automated test suites. A mutation test system as described herein in various implementations and examples may determine particular portions of source code to mutate, and particular subsets of test suites based on discreet source code modifications. As a result, generation of the mutated application(s) and execution of tests subsets on the mutated application(s) may be performed more quickly and using fewer computing resources, allowing mutation testing to be performed efficiently and practically within software development environments. For instance, pre-integration mutation testing may be performed in local development environments having fewer computing resources, allowing developers to verify the source code changes and the efficacy of the automated test suite(s) before code changes are checked-in to the shared code repository. Additionally, more efficient and targeted post-integration mutation testing may be performed in response to specific code changes submitted by developers. The improved time and resource efficiency of targeted mutation testing allows the software build, test, and development teams to more quickly detect deficiencies in the code and/or in the test coverage of the application, and to associate those deficiencies with specific changes to the source code.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method, comprising:
    receiving, by a computer system, a request to integrate a source code change into a codebase associated with an application; determining an application test suite associated with the application;
    determining a first line of source code associated with the requested source code change;
    analyzing, by the computer system, the first line of source code to determine a first source code attribute associated with the first line of source code, wherein the first source code attribute includes at least one of (a) a type of programming statement in the first line of source code, (b) a type of operator in the first line of source code, (c) an indication of a type of function invoked by the first line of source code, (d) an indication of whether the first line of source code is within a conditional code block, or (e) an indication of whether the first line of source code is within a programming loop;
    determining a first test subset of the application test suite, based at least in part on the first source code attribute associated with the first line of source code, wherein determining the first test subset comprises inputting the first source code attribute into a trained model configured to output data identifying a subset of the test suite;
    mutating, by the computer system, the source code change into a mutated source code change;
    building, by the computer system, a mutated application by compiling one or more software classes including the mutated source code change; and
    executing, by the computer system, the first test subset of the application test suite on the mutated application.

2. The computer-implemented method of claim 1, further comprising:
    determining that the source code change modifies a second line of source code within the codebase, wherein the second line of source code is within a different function from the first line of source code;
    determining a second set of tests associated with the second line of source code, wherein the second set of tests is a second subset of the test suite different from the first subset; and
    executing the second set of tests on the mutated application.

3. The computer-implemented method of claim 1, further comprising:
    initiating an operation to integrate the source code change into the codebase, based at least in part on test results associated with executing the first test subset.

4. The computer-implemented method of claim 1, wherein determining the first test subset for execution on the mutated application comprises:
    retrieving test results associated with a previous execution of the test suite, on a previous mutated application associated with the first line of source code; and
    determining, within the test results associated with a previous execution of the test suite, one or more passing tests; and
    excluding the one or more passing tests from the first subset of the test suite associated with the first line of source code.

5. The computer-implemented method of claim 1, wherein determining the first test subset for execution on the mutated application comprises:
    accessing a mapping storing associations between different subsets of the test suite, and corresponding lines of source code within the codebase.

6. The computer-implemented method of claim 1, wherein:
    mutating the source code change is based on a set of code mutation rules; and
    determining the first test subset for execution on the mutated application, is based at least in part on the set of code mutation rules.

7. The computer-implemented method of claim 1, further comprising:
    receiving a mutation test confidence level associated with the request to integrate the source code change; and
    determining the first test subset for execution on the mutated application, based at least in part on the mutation test confidence level.

8. One or more non-transitory computer-readable media storing instructions executable by a processor, wherein the instructions, when executed by the processor, cause the processor to perform operations comprising:
    receiving a request to integrate a source code change into a codebase associated with an application;
    determining an application test suite associated with the application;

determining a first line of source code associated with the requested source code change;

analyzing the first line of source code to determine a first source code attribute associated with the first line of source code, wherein the first source code attribute includes at least one of (a) a type of programming statement in the first line of source code, (b) a type of operator in the first line of source code, (c) an indication of a type of function invoked by the first line of source code, (d) an indication of whether the first line of source code is within a conditional code block, or (e) an indication of whether the first line of source code is within a programming loop;

determining a first test subset of the application test suite, based at least in part on the first source code attribute associated with the first line of source code, wherein determining the first test subset comprises inputting the first source code attribute into a trained model configured to output data identifying a subset of the test suite;

mutating the source code change into a mutated source code change;

building a mutated application based on the mutated source code change; and executing the first test subset of the application test suite on the mutated application.

9. The one or more non-transitory computer-readable media of claim 8, the operations further comprising:

determining that the source code change affects a second line of source code within the codebase, wherein the second line of source code is within a different function from the first line of source code;

determining a second set of tests associated with the second line of source code, wherein the second set of tests is a second subset of the test suite different from the first subset; and executing the second set of tests on the mutated application.

10. The one or more non-transitory computer-readable media of claim 8, wherein determining the first test subset comprises:

accessing a mapping storing associations between different subsets of the test suite, and at least one of corresponding lines of source code or corresponding functions within the codebase.

11. The one or more non-transitory computer-readable media of claim 8, wherein:

mutating the source code change is based on a set of code mutation rules; and determining the first test subset is based at least in part on the set of code mutation rules.

12. A computer-implemented method, comprising:

receiving, by a computer system, a request to integrate a source code change into a codebase associated with an application; determining an application test suite associated with the application;

determining a first line of source code associated with the requested source code change;

analyzing, by the computer system, the first line of source code to determine a first source code attribute associated with the first line of source code, wherein the first source code attribute includes at least one of (a) a type of programming statement in the first line of source code, (b) a type of operator in the first line of source code, (c) an indication of a type of function invoked by the first line of source code, (d) an indication of whether the first line of source code is within a conditional code block, or (e) an indication of whether the first line of source code is within a programming loop;

determining a first test subset of the application test suite, based at least in part on the first source code attribute associated with the first line of source code;

mutating, by the computer system, the source code change into a mutated source code change, wherein mutating the source code change comprises:

determining one or more code mutation rules, based at least in part on the first source code attribute associated with the first line of source code; and modifying the source code change, using the code mutation rules, into the mutated source code change;

building, by the computer system, a mutated application by compiling one or more software classes including the mutated source code change; and executing, by the computer system, the first test subset of the application test suite on the mutated application.

13. The computer-implemented method of claim 12, further comprising:

determining that the source code change modifies a second line of source code within the codebase, wherein the second line of source code is within a different function from the first line of source code;

determining a second set of tests associated with the second line of source code, wherein the second set of tests is a second subset of the test suite different from the first subset; and executing the second set of tests on the mutated application.

14. The computer-implemented method of claim 12, wherein determining the first test subset for execution on the mutated application comprises:

retrieving test results associated with a previous execution of the test suite, on a previous mutated application associated with the first line of source code; and determining, within the test results associated with a previous execution of the test suite, one or more passing tests; and excluding the one or more passing tests from the first subset of the test suite associated with the first line of source code.

15. The computer-implemented method of claim 12, wherein determining the first test subset for execution on the mutated application comprises:

accessing a mapping storing associations between different subsets of the test suite, and corresponding lines of source code within the codebase.

16. The computer-implemented method of claim 12, wherein:

mutating the source code change is based on a set of code mutation rules; and determining the first test subset for execution on the mutated application, is based at least in part on the set of code mutation rules.

17. The computer-implemented method of claim 12, further comprising:

receiving a mutation test confidence level associated with the request to integrate the source code change; and determining the first test subset for execution on the mutated application, based at least in part on the mutation test confidence level.

18. A computer system, comprising:

one or more processors; and one or more non-transitory computer-readable media storing computer-executable instructions that, when executed by the one or more processors, cause the one or more processors to perform operations comprising:

receiving, by the computer system, a request to integrate a source code change into a codebase associated with an application; determining an application test suite associated with the application;

determining a first line of source code associated with the requested source code change;

analyzing, by the computer system, the first line of source code to determine a first source code attribute associated with the first line of source code, wherein the first source code attribute includes at least one of (a) a type of programming statement in the first line of source code, (b) a type of operator in the first line of source code, (c) an indication of a type of function invoked by the first line of source code, (d) an indication of whether the first line of source code is within a conditional code block, or (e) an indication of whether the first line of source code is within a programming loop;

determining a first test subset of the application test suite, based at least in part on the first source code attribute associated with the first line of source code;

mutating, by the computer system, the source code change into a mutated source code change, wherein mutating the source code change comprises:

determining one or more code mutation rules, based at least in part on the first source code attribute associated with the first line of source code; and modifying the source code change, using the code mutation rules, into the mutated source code change;

building, by the computer system, a mutated application by compiling one or more software classes including the mutated source code change; and executing, by the computer system, the first test subset of the application test suite on the mutated application.

19. The computer system of claim 18, the operations further comprising:

determining that the source code change modifies a second line of source code within the codebase, wherein the second line of source code is within a different function from the first line of source code;

determining a second set of tests associated with the second line of source code, wherein the second set of tests is a second subset of the test suite different from the first subset; and executing the second set of tests on the mutated application.

20. The computer system of claim 18, wherein determining the first test subset for execution on the mutated application comprises:

retrieving test results associated with a previous execution of the test suite, on a previous mutated application associated with the first line of source code; and determining, within the test results associated with a previous execution of the test suite, one or more passing tests; and excluding the one or more passing tests from the first subset of the test suite associated with the first line of source code.

* * * * *